(12) United States Patent
Slobodyanyuk et al.

(10) Patent No.: US 12,146,942 B2
(45) Date of Patent: Nov. 19, 2024

(54) OBJECT DETECTION AND RANGING USING ONE-DIMENSIONAL RADAR ARRAYS

(71) Applicant: QUALCOMM Incorporated, San Diego, CA (US)

(72) Inventors: Volodimir Slobodyanyuk, San Diego, CA (US); Radhika Dilip Gowaikar, San Diego, CA (US); Makesh Pravin John Wilson, San Diego, CA (US); Amin Ansari, San Diego, CA (US); Michael John Hamilton, San Diego, CA (US); Shantanu Chaisson Sanyal, San Diego, CA (US); Sundar Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 755 days.

(21) Appl. No.: 17/337,614

(22) Filed: Jun. 3, 2021

(65) Prior Publication Data
US 2022/0390582 A1 Dec. 8, 2022

(51) Int. Cl.
*G01S 13/42* (2006.01)
*G01S 7/03* (2006.01)
*G01S 13/931* (2020.01)

(52) U.S. Cl.
CPC .............. *G01S 13/426* (2013.01); *G01S 7/03* (2013.01); *G01S 13/931* (2013.01)

(58) Field of Classification Search
CPC . G01S 7/03; G01S 7/352; G01S 7/356; G01S 7/417; G01S 13/426; G01S 13/588; G01S 13/89; G01S 13/931
See application file for complete search history.

(56) References Cited

U.S. PATENT DOCUMENTS

| | | | | |
|---|---|---|---|---|
| 5,675,343 A * | 10/1997 | Champeau | ........... | H01Q 21/296 342/372 |
| 9,739,881 B1 * | 8/2017 | Pavek | ........... | G01S 13/865 |
| 9,983,305 B2 * | 5/2018 | Pavek | ........... | G01S 13/931 |
| 10,473,775 B2 * | 11/2019 | Slemp | ........... | H01Q 3/04 |
| 11,002,845 B2 * | 5/2021 | Okamoto | ........... | G01S 7/414 |
| 11,327,170 B2 * | 5/2022 | Bialer | ........... | G01S 13/34 |
| 11,372,096 B2 * | 6/2022 | Slemp | ........... | G01S 13/42 |
| 11,496,141 B2 * | 11/2022 | Wang | ........... | G01S 13/426 |
| 2011/0199254 A1 * | 8/2011 | Bishop | ........... | G01S 13/867 342/179 |

(Continued)

OTHER PUBLICATIONS

International Search Report and Written Opinion—PCT/US2022/022850—ISA/EPO—Jul. 15, 2022.

*Primary Examiner* — Peter M Bythrow
(74) *Attorney, Agent, or Firm* — QUALCOMM Incorporated

(57) ABSTRACT

In some aspects, a system may receive, from a first one-dimensional radar array, first information based at least in part on first reflections associated with an azimuthal plane. The system may further receive, from a second one-dimensional radar array, second information based at least in part on second reflections associated with an elevation plane. Accordingly, the system may detect an object based at least in part on the first information and may determine an elevation associated with the object based at least in part on the second information. Numerous other aspects are described.

30 Claims, 8 Drawing Sheets

(56) References Cited

U.S. PATENT DOCUMENTS

| | | | |
|---|---|---|---|
| 2014/0125511 A1* | 5/2014 | Longstaff | G01S 13/347 |
| | | | 342/33 |
| 2015/0285904 A1* | 10/2015 | Rao | G01S 13/06 |
| | | | 342/146 |
| 2019/0195998 A1* | 6/2019 | Campbell | G01S 13/87 |
| 2019/0285738 A1* | 9/2019 | Iwasa | G01S 7/282 |
| 2019/0324134 A1* | 10/2019 | Cattle | G01S 7/024 |
| 2020/0096626 A1* | 3/2020 | Wang | G01S 13/4454 |
| 2020/0333457 A1* | 10/2020 | Bialer | G01S 7/352 |
| 2021/0320425 A1* | 10/2021 | Arkind | H01Q 21/061 |

\* cited by examiner

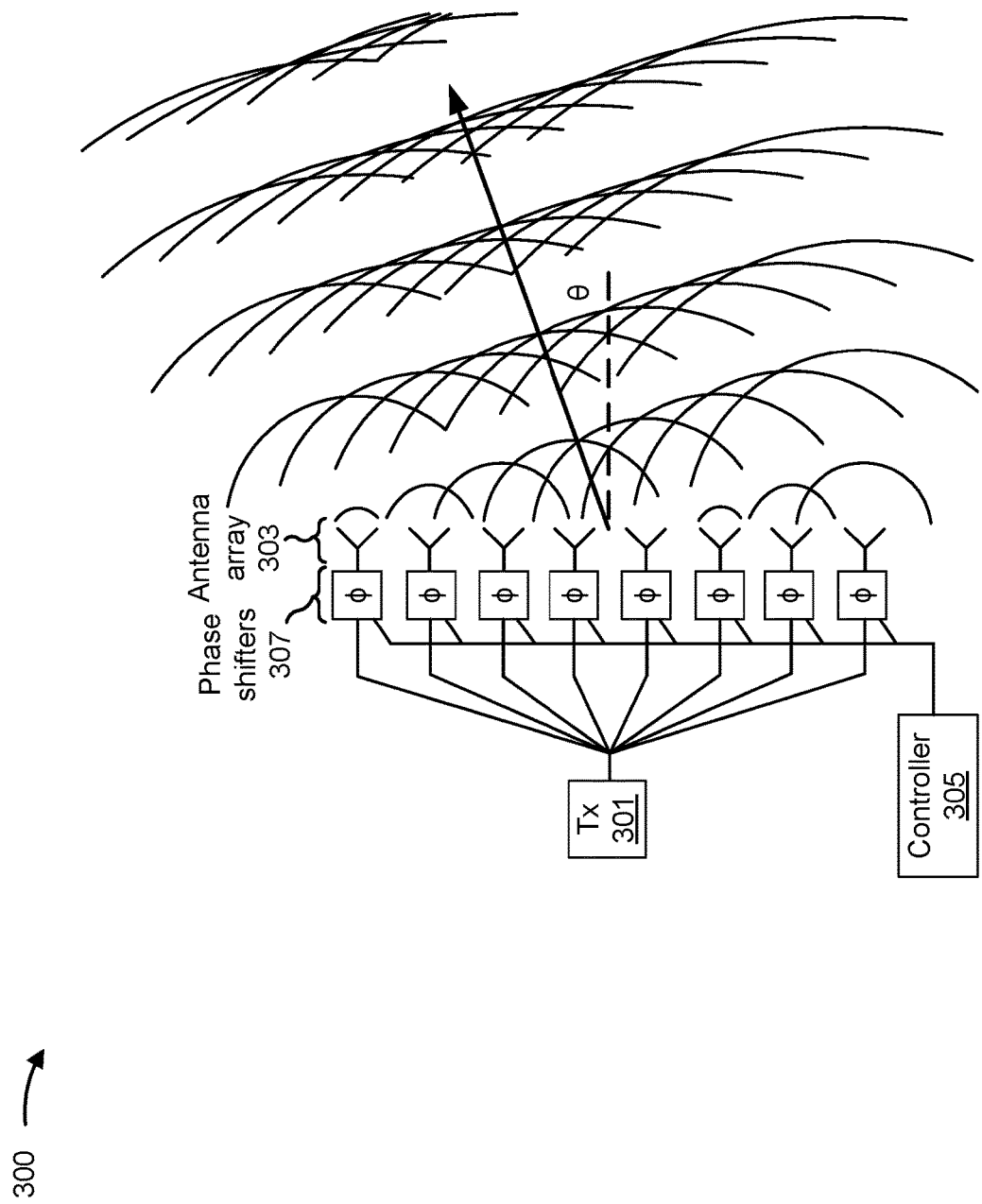

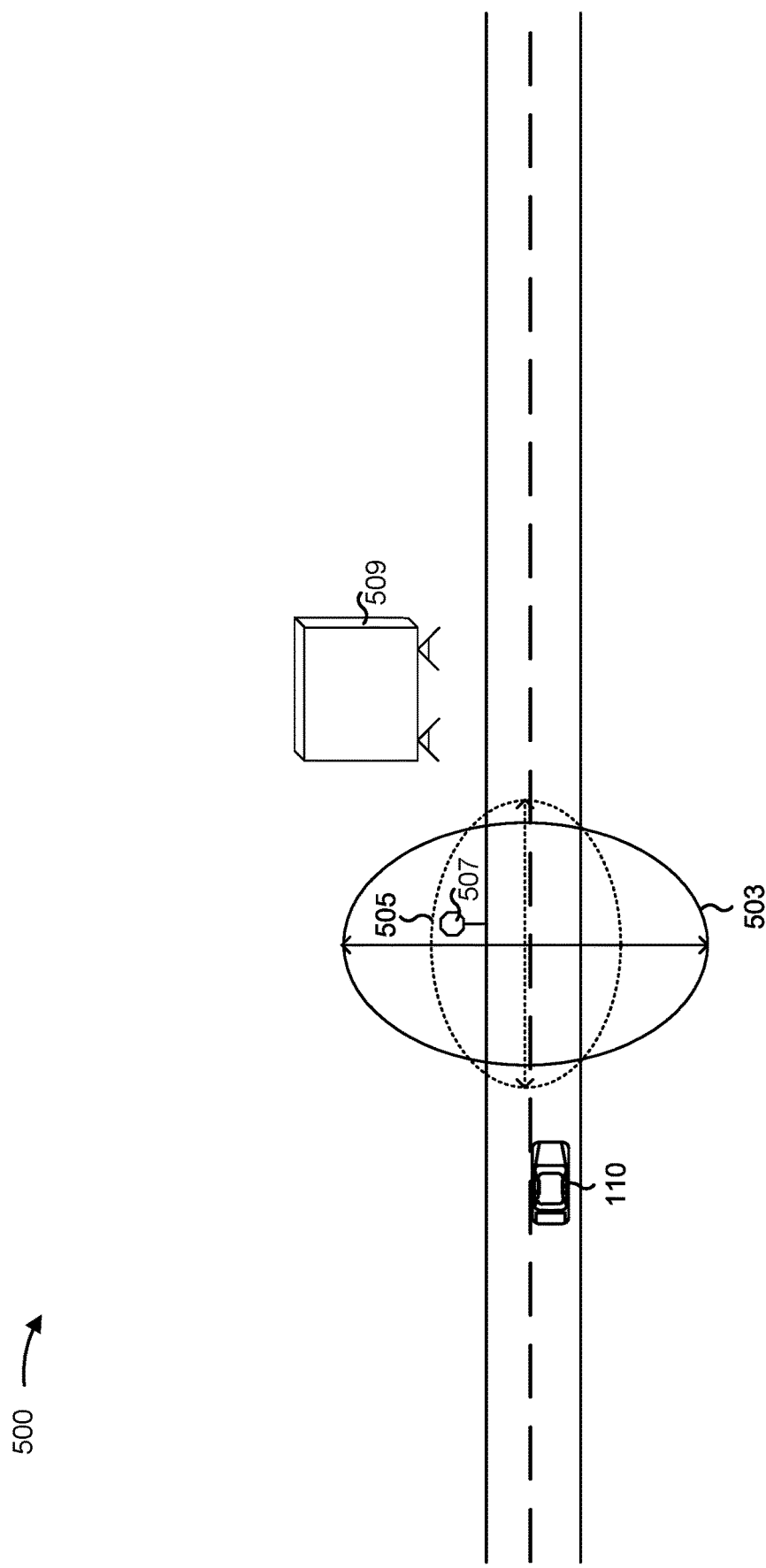

OBJECT DETECTION AND RANGING USING ONE-DIMENSIONAL RADAR ARRAYS

FIELD OF THE DISCLOSURE

Aspects of the present disclosure generally relate to radar and, for example, to object detection and ranging using one-dimensional radar arrays.

BACKGROUND

Mobile stations, such as automated vehicles, drones, and other autonomous or semi-autonomous transport devices, typically use radar (also referred to as "radio detection and ranging") sensors in order to detect objects near the mobile stations. Generally, a mobile station uses a directional antenna array to perform beamforming (whether analog or digital) and sweep a field-of-view (also referred to as an "FoV") associated with the mobile station. Accordingly, the mobile station may process received signals from the sweep in order to resolve locations (e.g., along an azimuthal plane), ranges, and elevations of objects within the FoV.

SUMMARY

In some aspects, a system for object detection includes a first one-dimensional radar array including a plurality of first antenna elements that are arranged corresponding to a first axis along an azimuthal plane and configured to transmit first signals and receive first reflections based at least in part on the first signals; a second one-dimensional radar array including a plurality of second antenna elements that are arranged corresponding to a second axis along an elevation plane and configured to transmit second signals and receive second reflections based at least in part on the second signals; and at least one processor configured to detect an object based at least in part on first information output from the first one-dimensional radar array and to determine an elevation associated with the object based at least in part on second information output from the second one-dimensional radar array.

In some aspects, a system for object detection includes at least one processor configured to receive, from a first one-dimensional radar array, first information based at least in part on first reflections associated with an azimuthal plane; receive, from a second one-dimensional radar array, second information based at least in part on second reflections associated with an elevation plane; detect an object based at least in part on the first information; and determine an elevation associated with the object based at least in part on the second information.

In some aspects, a method for object detection includes receiving, from a first one-dimensional radar array, first information based at least in part on first reflections associated with an azimuthal plane; receiving, from a second one-dimensional radar array, second information based at least in part on second reflections associated with an elevation plane; detecting an object based at least in part on the first information; and determining an elevation associated with the object based at least in part on the second information.

In some aspects, a non-transitory computer-readable medium storing a set of instructions for wireless communication includes one or more instructions that, when executed by one or more processors of an object detection system, cause the object detection system to receive, from a first one-dimensional radar array, first information based at least in part on first reflections associated with an azimuthal plane; receive, from a second one-dimensional radar array, second information based at least in part on second reflections associated with an elevation plane; detect an object based at least in part on the first information; and determine an elevation associated with the object based at least in part on the second information.

In some aspects, an apparatus for wireless communication includes means for receiving, from a first one-dimensional radar array, first information based at least in part on first reflections associated with an azimuthal plane; means for receiving, from a second one-dimensional radar array, second information based at least in part on second reflections associated with an elevation plane; means for detecting an object based at least in part on the first information; and means for determining an elevation associated with the object based at least in part on the second information.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example one-dimensional radar array, in accordance with the present disclosure.

FIGS. 4, 5A, and 5B are diagrams illustrating examples associated with object detection and ranging using one-dimensional radar arrays, in accordance with the present disclosure.

DETAILED DESCRIPTION

Figure 1:
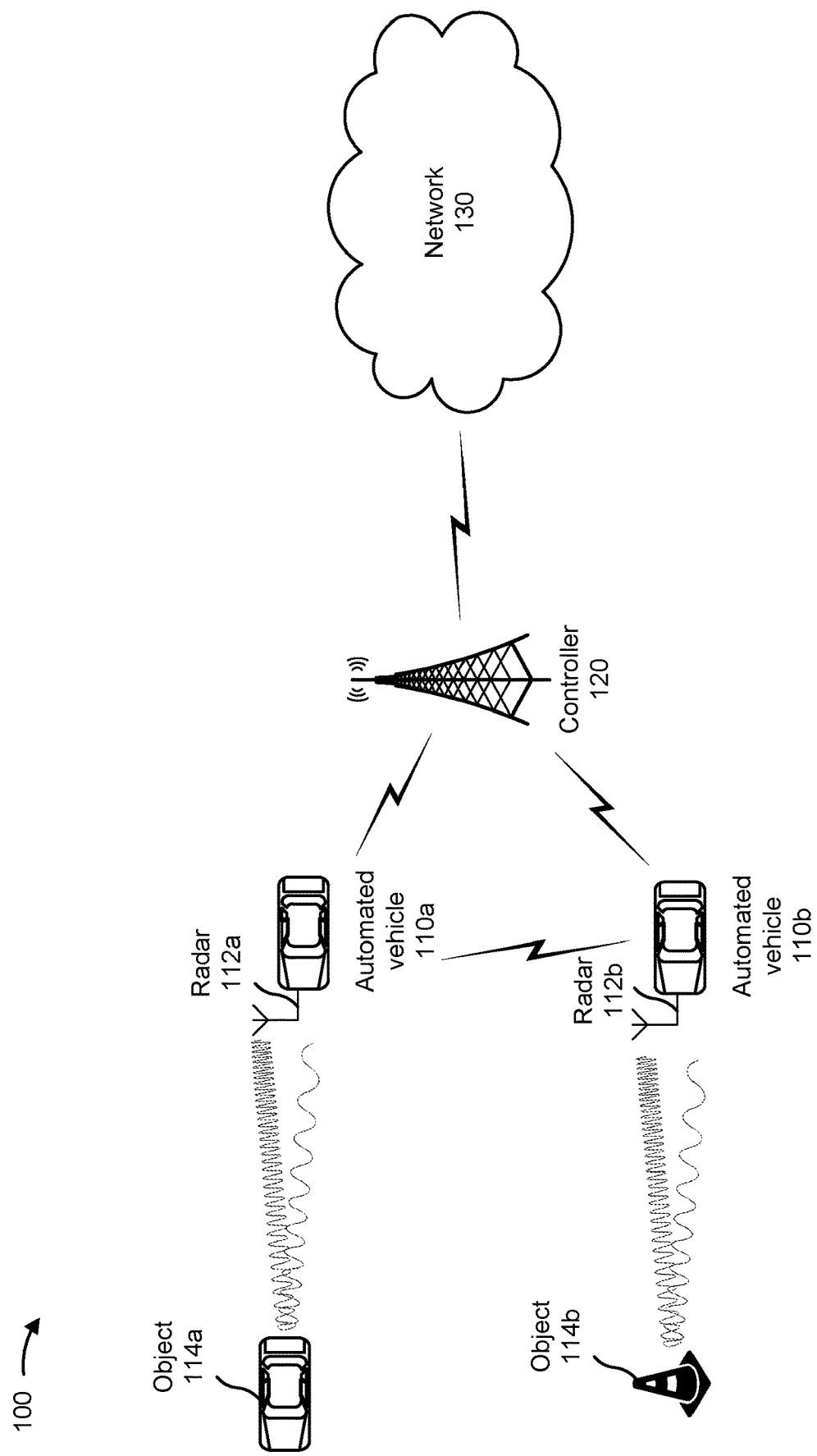
FIG. 1 is a diagram illustrating an example environment in which one-dimensional radar arrays described herein may be implemented, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Autonomous vehicles (or semi-autonomous vehicles or other automated transport devices) have to detect and respond to objects that are near the vehicles. For example, an autonomous vehicle should detect and respond to road signs (e.g., stop signs, yield signs, speed limit signs, and so on). Autonomous vehicles also have to detect and respond to objects on roadways or other paths associated with the vehicles. For example, an autonomous vehicle should detect and avoid large obstructions (e.g., fallen rocks), stopped vehicles, pedestrians, and other objects along a path of the vehicle.

In order to distinguish objects on the road (e.g., rocks, vehicles, pedestrians) from objects near the vehicle but not on the road (e.g., signs and bridges), many autonomous vehicles use two-dimensional antenna arrays to sweep FoVs associated with the vehicles. For example, the antenna array for a vehicle may beamform (e.g., in analog or digital) and sweep a beam back-and-forth across the FoV to detect objects, determine distances of the objects from the vehicle, and estimate elevations of the objects above a ground surface (e.g., the road on which the vehicle is traveling). However, two-dimensional antenna arrays are expensive to manufacture, consume significant amounts of power (which is limited for an autonomous vehicle, especially when the vehicle is electric and powered by a battery), and result in higher processing overhead to determine distances and elevations from received signals.

Reducing a quantity of antenna elements associated with an elevation plane reduces manufacturing cost, power consumption, and processing overhead associated with the two-dimensional antenna array. However, this reduces accuracy of elevation measurements, and accurate elevation measurements are needed to ensure the vehicle does not try to go under a bridge or other structure that has an associated clearance smaller than a height of the vehicle. Additionally, accurate elevation measurements are needed to ensure the vehicle does not try to drive over a rock or other obstruction that is tall enough to damage the vehicle.

Some implementations described herein enable a mobile station, such as an autonomous vehicle, to use a first one-dimensional radar array to estimate distances of objects detected within an azimuthal plane and a second one-dimensional radar array to estimate elevations of the detected objects. The one-dimensional radar arrays can achieve higher accuracy with less power consumption and lower processing overhead as compared with two-dimensional radar arrays, as well as being less expensive to manufacture. Additionally, the one-dimensional radar arrays can be dimensioned such that elevations for objects not within a threshold distance of a path of the mobile station (e.g., billboards, trees, and other objects not on or near a road) are not measured. As a result, the mobile station conserves power and processing resources while still determining elevations for some objects (e.g., bridges, road signals, and other objects on or near the road) with sufficient accuracy to protect the vehicle (e.g., from attempting to go under a bridge or other structure that has an associated clearance smaller than a height of the vehicle or attempting to drive over a rock or other obstruction that is tall enough to damage the vehicle, among other examples).

FIG. 1 is a diagram of an example environment 100 in which systems and/or methods described herein may be implemented. As shown in FIG. 1, environment 100 may include a plurality of mobile stations, such as automated vehicle 110a and automated vehicle 110b. Although the description herein focuses on automated vehicles, the description similarly applies to other mobile stations, such as drones or other autonomous or semi-autonomous transport devices. The automated vehicles 110a and 110b may communicate with each other as well as a controller 120. The controller 120 may communicate with a network 130, such that the automated vehicles 110a and 110b may receive data from and transmit data to the network 130 via the controller 120. Additionally, or alternatively, the automated vehicles 110a and 110b may receive data from and transmit data to the network 130 directly.

Accordingly, devices of environment 100 may interconnect via wired connections (e.g., the controller 120 may connect to the network 130 via a wired backhaul), wireless connections (e.g., the automated vehicles 110a and 110b may connect to the controller 120 via an over-the-air (OTA) interface, such as a Uu interface, and the automated vehicles 110a and 110b may connect to each other via an OTA interface, such as a PC5 interface, among other examples), or a combination of wired and wireless connections (e.g., the controller 120 may connect to the network 130 via a wireless backhaul in addition to or in lieu of a wired backhaul).

The automated vehicles 110a and 110b may each include a communication device and/or a computing device. For example, the automated vehicles 110a and 110b may each include a wireless communication device, a mobile phone, a user equipment (UE), a laptop computer, a tablet computer, a gaming console, a wearable communication device (e.g., a smart wristwatch, a pair of smart eyeglasses, a head mounted display, or a virtual reality headset), or a similar type of device. As shown in FIG. 1, the automated vehicles 110a and 110b may each further include one or more sensors, such as radars 112a and 112b, respectively. As shown in FIG. 1, the radar 112a may transmit a signal, which reflects off one or more external objects (e.g., object 114a, which is another vehicle in example 100). The reflection signal may be detected by the radar 112a (e.g., when the radar 112a uses at least one transceiver) and/or another receiving device, such as a separate antenna. Similarly, the radar 112b may transmit a signal, which reflects off one or more external objects (e.g., object 114b, which is a traffic object in example 100). The reflection signal may be detected by the radar 112b (e.g., when the radar 112b uses at least one transceiver) and/or another receiving device, such as a separate antenna. Accordingly, the automated vehicles 110a and 110b may use radars 112a and 112b, respectively, to detect and measure nearby objects. In other examples, the automated vehicle 110a and/or the automated vehicle 110b may use additional radars (e.g., two radars or more) and/or other sensors (e.g., one or more cameras and/or one or more infrared sensors, among other examples). In some implementations, the automated vehicle 110a and/or the automated vehicle 110b may implement a system and/or method for object detection and ranging, as described elsewhere herein.

Controller 120 may include one or more devices capable of communicating with the automated vehicle 110a and the automated vehicle 110b, such as a base station (BS) of a cellular network, a mobile termination (MT) unit in an integrated access and backhaul (IAB) network, a distributed unit (DU) in an IAB network, a central unit (CU) in an TAB network, a wireless local area network (WLAN) access point (AP), a platooning control system (PCS), a road side unit (RSU), and/or another autonomous vehicle control system, among other examples. Accordingly, the controller 120 may include one or more devices capable of receiving coordination and control signals from the network 130 via a backhaul. For example, the controller 120 may connect to a telecommunications core network, such as a 5G next generation core network (NG Core), a Long Term Evolution (LTE) evolved packet core (EPC), and/or another similar telecommunications core network, via the network 130. Additionally, or alternatively, the controller 120 may connect to a remote server associated with a fleet of autonomous vehicles, including the automated vehicle 110a and the automated vehicle 110b, via the network 130. The controller 120 may provide communication coverage for a particular geographic area. In standards promulgated by the Third Generation Partnership Project (3GPP), the term "cell" can refer to a coverage area of a BS and/or a BS subsystem serving this coverage area, depending on the context in which the term is used.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2A:
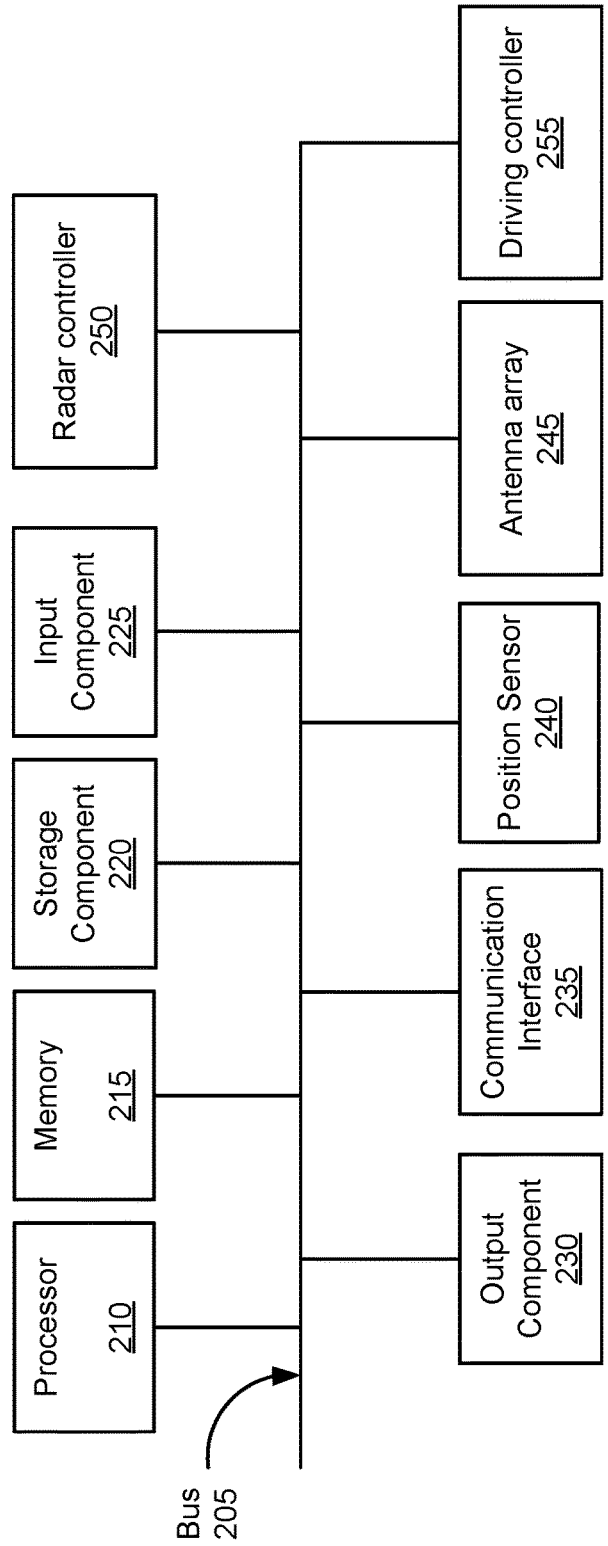
FIG. 2A is a diagram illustrating example components of one or more devices shown in FIG. 1, such as an automated vehicle, in accordance with the present disclosure.

FIG. 2A is a diagram illustrating example components of a device 200, in accordance with the present disclosure. Device 200 may correspond to automated vehicle 110a and/or automated vehicle 110b. In some aspects, the automated vehicle 110a and/or the automated vehicle 110b may each include one or more devices 200 and/or one or more components of device 200. As shown in FIG. 2A, device 200 may include a bus 205, a processor 210, a memory 215, a storage component 220, an input component 225, an output component 230, a communication interface 235, a position sensor 240, an antenna array 245, a radar controller 250, and/or a driving controller 255.

Bus 205 includes a component that permits communication among the components of device 200. Processor 210 is implemented in hardware or a combination of hardware and software. Processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a solid state drive (SSD), a flash memory, a RAM, a ROM and/or another type of non-transitory computer-readable medium.

Input component 225 includes a component that permits device 200 to receive information, such as via user input (e.g., a touch screen display, a keyboard, a keypad, a mouse, a button, a switch, and/or a microphone). Output component 230 includes a component that provides output information from device 200 (e.g., a display, a speaker, a haptic feedback component, and/or an audio or visual indicator).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency interface, a universal serial bus (USB) interface, a wireless local area interface (e.g., a Wi-Fi interface), and/or a cellular network interface.

Position sensor 240 includes a component that determines a position associated with the device 200. In some implementations, position sensor 240 may generate a measurement of absolute position (e.g., using inertial coordinates) associated with the device 200, or of relative position (e.g., with reference to a stationary point, such as a center of Earth or a base station, and/or with reference to a surface, such as a surface of Earth) associated with the device 200. For example, position sensor 240 may include a global positioning system (GPS) global navigation satellite system (GNSS) device, a magnetometer, a gyroscope, an accelerometer, and/or another similar sensor.

Antenna array 245 includes a plurality of one-dimensional radar arrays (e.g., as described below in connection with FIG. 3). Each radar array may include a controller and a plurality of phase shifters that control a direction of the radar array along an associated plane. In some implementations, antenna array 245 may include a set of antennas for transmission and a separate set of antennas for reception within a one-dimensional radar array. As an alternative, antenna array 245 may use a same set of antennas for transmission and for reception within a one-dimensional radar array. Accordingly, each one-dimensional radar array within antenna array 245 may function as a transceiver.

Radar controller 250 includes a component that detects and measures movement of an object external to device 200. For example, radar controller 250 may transmit control signals to the antenna array 245 in order to perform radio frequency radar. Radar controller 250 may receive signals from the antenna array 245 and use the signals to determine a distance and an elevation associated with the object external to device 200, as described elsewhere herein.

Driving controller 255 includes a component that determines and transmits instructions for a driving component associated with the device 200. For example, driving controller 255 may receive a distance and/or an elevation associated with an external object, from the radar controller 250, and determine an instruction for the driving component based at least in part on the distance and/or the elevation. Driving controller 255 may transmit instructions to an accelerator device, a braking device, a steering device, a headlamp, a turn signal, and/or another component associated with an autonomous transport device that includes the device 200.

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, device 200 may include means for means for receiving, from a first one-dimensional radar array, first information based at least in part on first reflections associated with an azimuthal plane; means for receiving, from a second one-dimensional radar array, second information based at least in part on second reflections associated with an elevation plane; means for detecting an object based at least in part on the first information; and/or means for determining an elevation associated with the object based at least in part on the second information. In some aspects, such means may include one or more components of device 200 described in connection with FIG. 2A, such as bus 205, processor 210, memory 215, storage component 220, input component 225, output component 230, communication interface 235, position sensor 240, antenna array 245, radar controller 250, and/or driving controller 255.

The number and arrangement of components shown in FIG. 2A are provided as an example. In practice, device 200 may include additional components, fewer components, different components, or differently arranged components than those shown in FIG. 2A. Additionally, or alternatively, a set of components (e.g., one or more components) of device 200 may perform one or more functions described as being performed by another set of components of device 200.

Figure 2B:
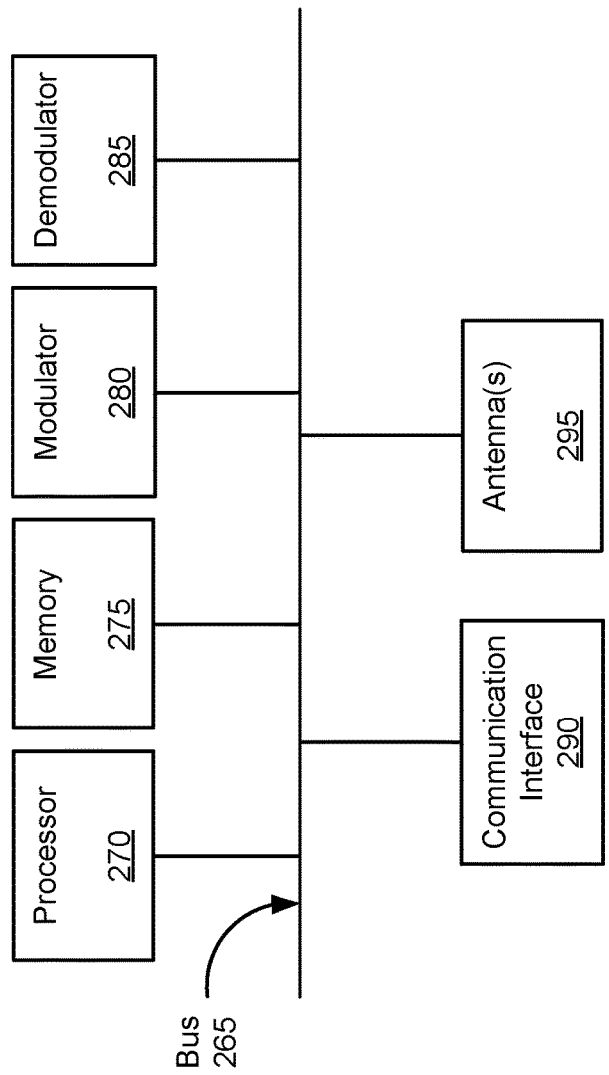
FIG. 2B is a diagram illustrating example components of one or more devices shown in FIG. 1, such as a radar, in accordance with the present disclosure.

FIG. 2B is a diagram illustrating example components of a device 260, in accordance with the present disclosure. Device 260 may be a radar device. Device 260 may be included in device 200 of FIG. 2A. Accordingly, in some implementations, automated vehicle 110a and/or automated vehicle 110b may include one or more devices 260 and/or one or more components of device 260. As shown in FIG. 2B, device 260 may include a bus 265, a processor 270, a memory 275, a modulator 280, a demodulator 285, a communication interface 290, and/or one or more antennas 295.

Bus 265 includes a component that permits communication among the components of device 260. Processor 270 is implemented in hardware or a combination of hardware and software. Processor 210 is a CPU, a GPU, an APU, a microprocessor, a microcontroller, a DSP, a FPGA, an ASIC, or another type of processing component. In some implementations, processor 270 includes one or more processors capable of being programmed to perform a function. For example, processor 270 may transmit signals to modulator 280 and/or antenna(s) 295 that cause transmission of one or more radar signals. Additionally, or alternatively, processor 270 may perform some pre-processing on received signals from demodulator 285 and/or antenna(s) 295 before the pre-processed signals are sent (e.g., via communication interface 290) to another processor (e.g., processor 210 of device 200) for further processing. Memory 275 includes a RAM, a ROM, and/or another type of dynamic or static storage device (e.g., a flash memory, a magnetic memory, and/or an optical memory) that stores information and/or instructions for use by processor 270.

Modulator 280 includes a component that generates an analog signal for transmission (e.g., using antenna(s) 295). For example, modulator 280 may encode a digital signal as an electromagnetic signal that can be transmitted OTA (e.g., by antenna(s) 295). Similarly, demodulator 285 includes a component that generates a digital signal for processing based at least in part on an analog signal (e.g., received using antenna(s) 295). For example, demodulator 285 may decode a digital signal based at least in part on an electromagnetic signal that was received (e.g., by antenna(s) 295). In some implementations, device 260 may support beamforming such that processor 270 and/or modulator 280 causes antenna(s) 295 to sweep a radio beam along an axis of an associated plane, and demodulator 285 and/or processor 270 filters analog signals, from the antenna(s) 295, based at least in part on the stable frequency, such that objects near device 260 and within a threshold distance of the axis can be detected (e.g., using the Doppler effect).

Communication interface 290 includes a transceiver-like component (e.g., a transceiver and/or a separate receiver and transmitter) that enables device 200 to communicate with other devices, such as via a wired connection, a wireless connection, or a combination of wired and wireless connections. Communication interface 290 may permit device 200 to receive information from another device and/or provide information to another device. For example, communication interface 290 may include an Ethernet interface, an optical interface, a coaxial interface, an infrared interface, a radio frequency interface, a USB interface, a wireless local area interface (e.g., a Wi-Fi interface), a cellular network interface, and/or the like.

Antenna(s) 295 includes one or more antenna elements that transmit electromagnetic signals based at least in part on analog signals and/or generate analog signals based at least in part on received electromagnetic signals. In some implementations, antenna(s) 295 may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings.

Device 260 may perform one or more processes described herein. Device 260 may perform these processes based on processor 270 executing software instructions stored by a non-transitory computer-readable medium, such as memory 275. A computer-readable medium is defined herein as a non-transitory memory device. A memory device includes memory space within a single physical storage device or memory space spread across multiple physical storage devices.

Software instructions may be read into memory 275 from another computer-readable medium or from another device via communication interface 290. When executed, software instructions stored in memory 275 may cause processor 270 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some implementations, device 260 includes means for performing one or more processes described herein and/or means for performing one or more operations of the processes described herein. For example, device 260 may include means for transmitting first signals and means for receiving first reflections based at least in part on the first signals; means for transmitting second signals and means for receiving second reflections based at least in part on the second signals; means for generating first information based at least in part on the first reflections; and/or means for generating second information based at least in part on the second reflections. In some implementations, such means may include one or more components of device 260 described in connection with FIG. 2B, such as bus 265, processor 270, memory 275, modulator 280, demodulator 285, communication interface 290, and/or antenna(s) 295.

The number and arrangement of components shown in FIG. 2B are provided as an example. In practice, device 260 may include additional components, fewer components, different components, or differently arranged components than those shown in FIG. 2B. Additionally, or alternatively, a set of components (e.g., one or more components) of device 260 may perform one or more functions described as being performed by another set of components of device 260.

FIG. 3 is a diagram illustrating an example 300 of a one-dimensional radar array, in accordance with the present disclosure. As shown in FIG. 3, example 300 includes a transmitter (Tx) 301 that generates digital signals and/or analog signals (e.g., using a digital-to-analog converter), using a modulator, for transmission by antenna array 303 as radio signals.

The antenna array 303 may include a plurality of antenna elements arrayed along a single dimension. Accordingly, the antenna array 303 is one-dimensional. In example 300, the antenna array 303 both transmits radio signals and receives reflections of those radio signals from objects within an FoV associated with the antenna array 303. As an alternative, in some implementations, a separate set of antenna elements arrayed along the same dimension as the antenna array 303 may receive the reflections.

As further shown in FIG. 3, a controller 305 may instruct a plurality of phase shifters 307, corresponding to the plurality of antenna elements included in the antenna array 303. The phase shifters 307 may control timing of transmissions from the antenna array 303 in order to form a directional beam from the antenna array 303 using superposition of radio waves from different antenna elements in the antenna array 303. For example, FIG. 3 shows a directional beam associated with an angle (e.g., represented by $\theta$ in example 300) from a normal vector associated with the antenna array 303. Accordingly, the controller 305 may delay transmissions from antenna elements closer to the controller 305 as compared with antenna elements further from the controller 305 such that the superposition of radio waves results in a directional beam as shown in FIG. 3.

The number and arrangement of components shown in FIG. 3 are provided as an example. In practice, a one-dimensional radar array may include additional components, fewer components, different components, or differently arranged components than those shown in FIG. 3. Additionally, or alternatively, other beamforming techniques, such as Butler matrix beamforming, multiple signal classification (MUSIC) beamforming, and/or iterative sparse asymptotic minimum variance (SAMV) beamforming, among other examples, may be used by one-dimensional radar arrays described herein.

As indicated above, FIG. 3 is provided as an example. Other examples may differ from what is described with respect to FIG. 3.

Figure 4:
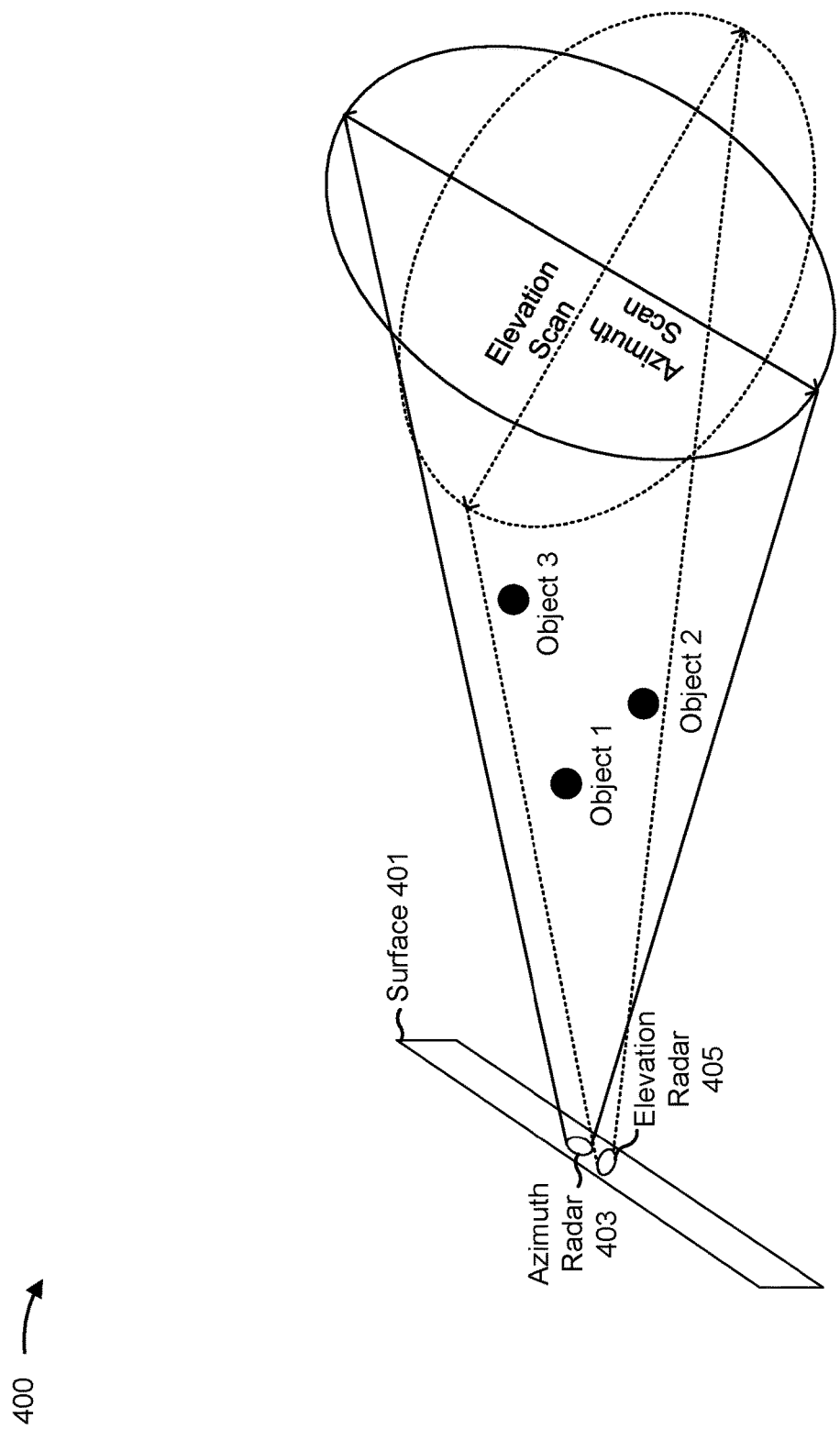

FIG. 4 is a diagram illustrating an example 400 associated with object detection and ranging using one-dimensional radar arrays, in accordance with the present disclosure. As shown in FIG. 4, example 400 includes a first one-dimensional radar array 403 and a second one-dimensional radar array 405. The radar arrays 403 and 405 may each be configured as described above in connection with FIG. 3. The radar arrays 403 and 405 may be associated with a mobile station (e.g., affixed to a surface of the mobile station, such as surface 401). For example, the mobile station may include an autonomous or semi-autonomous vehicle such that the surface 401 includes a bumper of the vehicle or another fixed surface of the vehicle.

Radar array 403 may include a plurality of first antenna elements that are arranged corresponding to a first axis along an azimuthal plane. Accordingly, as shown in FIG. 4, radar array 403 may also be referred to as an azimuthal radar 403. The azimuthal radar 403 may be configured to transmit first signals and receive first reflections based at least in part on the first signals.

In some implementations, the azimuthal radar 403 is configured to scan along the first axis by using beamforming to generate the first signals. For example, the azimuthal radar 403 may include a controller (and/or another type of processor) that is configured to use antenna elements of the azimuthal radar 403 to beamform (e.g., as described above in connection with FIG. 3) and to adjust the beamforming so as to change a directionality associated with transmissions from the azimuthal radar 403 in order to scan along the first axis (shown as the "Azimuth Scan" in FIG. 4).

In some implementations, and as shown in FIG. 4, the azimuthal radar 403 is associated with a range along the first axis and a range along the second axis, and the range along the first axis is larger than the range along the second axis. Accordingly, in example 400, the azimuthal radar 403 covers a portion of an FoV associated with the mobile station, where the portion is associated with an elliptical (or rectangular or other similarly shaped) projection on the azimuthal plane. Accordingly, a semi-major axis of the ellipse may correspond to the range along the first axis, and a semi-minor axis of the ellipse may correspond to the range along the second axis.

Radar array 405 may include a plurality of second antenna elements that are arranged corresponding to a second axis along an elevation plane. Accordingly, as shown in FIG. 4, radar array 405 may also be referred to as an elevation radar 405. The elevation radar 405 may be configured to transmit second signals and receive second reflections based at least in part on the second signal.

In some implementations, the elevation radar 405 is configured to scan along the second axis by using beamforming to generate the second signals. For example, the elevation radar 405 may include a controller (and/or another type of processor) that is configured to use antenna elements of the elevation radar 405 to beamform (e.g., as described above in connection with FIG. 3) and to adjust the beamforming so as to change a directionality associated with transmissions from the elevation radar 405 in order to scan along the second axis (shown as the "Elevation Scan" in FIG. 4).

In some implementations, and shown in FIG. 4, the elevation radar 405 is associated with a range along the first axis and a range along the second axis, and the range along the second axis is larger than the range along the first axis. Accordingly, in example 400, the elevation radar 405 covers a portion of an FoV associated with the mobile station, where the portion is associated with an elliptical (or rectangular or other similarly shaped) projection on the elevation plane. Accordingly, a semi-major axis of the ellipse may correspond to the range along the second axis, and a semi-minor axis of the ellipse may correspond to the range along the first axis.

As further shown in FIG. 4, the first range associated with the azimuthal radar 403 may be larger than the first range associated with the elevation radar 405. For example, the azimuthal radar 403 may cover a larger portion of the FoV along the azimuthal plane than the elevation radar 405. Additionally, the second range associated with the azimuthal radar 403 may be smaller than the second range associated with the elevation radar 405. For example, the azimuthal radar 403 may cover a smaller portion of the FoV along the elevation plane than the elevation radar 405.

The mobile station may further include at least one processor. The at least one processor may be at least partially integrated (e.g., physically, virtually, and/or logically) with the controller included in the azimuthal radar 403 and/or the controller included in the elevation radar 405. As an alternative, the at least one processor may be separate (e.g., physically, virtually, and/or logically) from the controller(s).

The at least one processor may receive, from the azimuthal radar 403, first information based at least in part on first reflections associated with an azimuthal plane. Similarly, the at least one processor may receive, from the elevation radar 405, second information based at least in part on second reflections associated with an elevation plane. For example, the first information and the second information may include digital information generated based at least in part on analog-to-digital conversion and/or filtering of the first reflections and the second reflections, respectively. The first information and the second information may be associated with a single direction (e.g., a single beam) or a plurality of directions (e.g., a scan performed using multiple beams). In some implementations, the first information and the second information may be associated with a synchronized time frame (e.g., based at least in part on simultaneous radio transmissions and/or scans from the azimuthal radar 403 and the elevation radar 405).

Accordingly, the at least one processor may detect an object based at least in part on the first information output from the azimuthal radar 403. For example, the at least one processor may identify brightness and/or wavelength profiles within the first reflections in order to detect one or more objects in the FoV associated with the mobile station (e.g., "Object 1," "Object 2," and "Object 3" in example 400). In some implementations, the at least one processor may also estimate a distance (e.g., from the azimuthal radar 403) associated with the object. For example, the at least one processor may use Doppler shifts and/or other wavelength shifts associated with the first reflections in order to estimate the distance.

Additionally, the at least one processor may determine an elevation associated with the object based at least in part on the second information output from the elevation radar 405. For example, the at least one processor may use Doppler shifts and/or other wavelength shifts associated with the second reflections in order to estimate the elevation associated with the object. In some implementations, the at least one processor may also detect the object within the second reflections based at least in part on brightness and/or wavelength profiles.

In some implementations, the at least one processor may correlate the object detected within the first reflections with the object detected within the second reflections (e.g., to identify that the same object is within the first reflections and the second reflections). In one example, the at least one processor may determine a first distance associated with the object (e.g., using Doppler shifts and/or other wavelength shifts) based at least in part on the first information from the azimuthal radar 403. Similarly, the at least one processor may determine a second distance associated with the object (e.g., using Doppler shifts and/or other wavelength shifts) based at least in part on the second information from the elevation radar 405. Accordingly, the at least one processor may correlate the determined elevation (e.g., based at least in part on the second information) with the object (e.g., detected based at least in part on the first information) based at least in part on a correspondence between the first distance and the second distance. For example, the at least one processor may determine that the same object is detected within the first reflections and the second reflections when the first distance and the second distance are within a threshold amount of distance (e.g., approximately equal and/or within a margin of error, such as 1%, 2%, and so on). Additionally, or alternatively, the at least one processor may determine that the same object is detected within the first reflections and the second reflections when a difference between the first distance and the second distance are within a threshold amount of distance of a distance between the azimuthal radar 403 and the elevation radar 405. For example, the azimuthal radar 403 and the elevation radar 405 may be affixed to different portions of surface 401 (or to different surfaces of the mobile station) such that there is a non-zero distance between the azimuthal radar 403 and the elevation radar 405. Accordingly, the at least one processor may determine that the same object is detected within the first reflections and the second reflections when the difference between the first distance and the second distance is approximately equal to and/or within a margin of error (such as 1%, 2%, and so on) of the distance between the azimuthal radar 403 and the elevation radar 405.

Additionally, or alternatively, the at least one processor may correlate the object detected within the first reflections with the object detected within the second reflections based at least in part on tracking the object across frames (e.g., different scanning cycles performed by the azimuthal radar 403 and the elevation radar 405). For example, the at least one processor may identify the object in a first frame based at least in part on the first information from the azimuthal radar 403 and identify the object in a second frame, subsequent to the first frame, based at least in part on the first information from the azimuthal radar 403. Similarly, the at least one processor may identify the object in the first frame based at least in part on the second information from the elevation radar 405 and identify the object in the second frame, subsequent to the first frame, based at least in part on the second information from the elevation radar 405. Accordingly, based at least in part on tracking the object across the first frame and the second frame, the at least one processor may determine that the same object is detected within the first reflections and the second reflections. For example, the at least one processor may determine that a translation of the object within the first reflections from the first frame to the second frame is within a threshold of a translation of the object within the second reflections from the first frame to the second frame. In some implementations, the at least one processor may apply a spatial filter to the translation associated with the first reflections to estimate an expected translation associated with the second reflections and/or apply a spatial filter to the translation associated with the second reflections to estimate an expected translation associated with the first reflections. Accordingly, the at least one processor may correlate the determined elevation with the object based at least in part on the translation associated with the first reflections being within a threshold of the expected translation associated with the second reflections and/or the translation associated with the second reflections being within a threshold of the expected translation associated with the first reflections.

Accordingly, the at least one processor may output (e.g., to a display and/or other output device) the elevation for communication to a user and/or for further processing (e.g., as described below). For example, the user may be informed of the elevation associated with a bridge, a rock, and/or other object detected by the mobile station. Additionally with determining the elevation, the at least one processor may determine a set of coordinates associated with the object (e.g., in a coordinate system local to the mobile station, in an inertial coordinate system, and/or in a global coordinate system) based at least in part on the distance associated with the object (e.g., estimated based at least in part on the first information and/or the second information, as described above) and the elevation associated with the object. In some implementations, the at least one processor may output (e.g., to a display and/or other output device) the set of coordinates for communication to a user and/or for further processing (e.g., as described below). For example, the user may be informed of the coordinates associated with a bridge, a rock, and/or other object detected by the mobile station.

In some implementations, the at least one processor may additionally generate a three-dimensional mapping indicating the object based at least in part on the set of coordinates. For example, the three-dimensional mapping may include a point cloud or other visual representation that includes the object based at least in part on the set of coordinates. In some implementations, the at least one processor may output (e.g., to a display and/or other output device) the three-dimensional mapping for communication to a user and/or for further processing (e.g., as described below). For example, the user may view the three-dimensional mapping that shows a bridge, a rock, and/or other object detected by the mobile station.

In some implementations, in addition to or in lieu of outputting the distance, the elevation, and/or the set of coordinates associated with the object to the user, the at least one processor may generate an instruction, for an automated vehicle that includes the at least one processor (e.g., the mobile station), based at least in part on the elevation. For example, the at least one processor may instruct an accelerator device, a brake device, and/or a steering device such that the automated vehicle drives over the object in the road when the elevation satisfies a threshold. On the other hand, the at least one processor may instruct an accelerator device, a brake device, and/or a steering device such that the automated vehicle moves around the object in the road when the elevation does not satisfy the threshold. In another example, the at least one processor may instruct an accelerator device, a brake device, and/or a steering device such that the automated vehicle proceeds under the object (e.g., which may be a bridge or other overhead structure) when the elevation satisfies a threshold. On the other hand, the at least one processor may instruct an accelerator device, a brake device, and/or a steering device such that the automated vehicle stops and/or changes course when the elevation does not satisfy the threshold (e.g., when the automated vehicle will not clear the bridge or other overhead structure).

As described above, the azimuthal radar 403 may cover a larger portion of the FoV along the azimuth plane than the elevation radar 405. Accordingly, in some implementations, the at least one processor may detect an additional object based at least in part on the first information from the azimuthal radar 403 and determine that the additional object is outside a range associated with the elevation radar 405 (e.g., as described below in connection with object 509 of FIG. 5A). Accordingly, the at least one processor may refrain from determining an elevation associated with the additional object based at least in part on the additional object being outside the range. As a result, the at least one processor conserves power and computing resources by not determining elevations for objects whose elevations will not interfere with or affect movement of the mobile station. Additionally, the second reflections may not even include the additional object because the elevation radar 405 covers a smaller portion of the FoV along the azimuth plane than the azimuthal radar 403. Accordingly, the at least one processor does not waste power and computing resources attempting to detect the additional object based at least in part on the second information because the at least one processor may determine that the additional object is unlikely to be included in the second reflections.

By using techniques as described in connection with FIG. 4, the mobile station may use the one-dimensional azimuthal radar 403 to estimate distances of objects within the azimuthal plane and the one-dimensional elevation radar 405 to estimate elevations of the detected objects. The azimuthal radar 403 and the elevation radar 405 can achieve higher accuracy with less power consumption and lower processing overhead as compared with two-dimensional radar arrays, as well as being less expensive to manufacture. Additionally, the azimuthal radar 403 and the elevation radar 405 can be dimensioned such that elevations for objects not within a threshold distance of a path of the mobile station are not measured (e.g., as described below in connection with FIGS. 5A and 5B). As a result, the mobile station conserves power and processing resources while still determining elevations for some objects (e.g., bridges, road signals, and other objects on or near the road) with sufficient accuracy to protect the vehicle (e.g., from attempting to go under a bridge or other structure that has an associated clearance smaller than a height of the vehicle or attempting to drive over a rock or other obstruction that is tall enough to damage the vehicle, among other examples).

As indicated above, FIG. 4 is provided as an example. Other examples may differ from what is described with respect to FIG. 4.

Figure 5B:
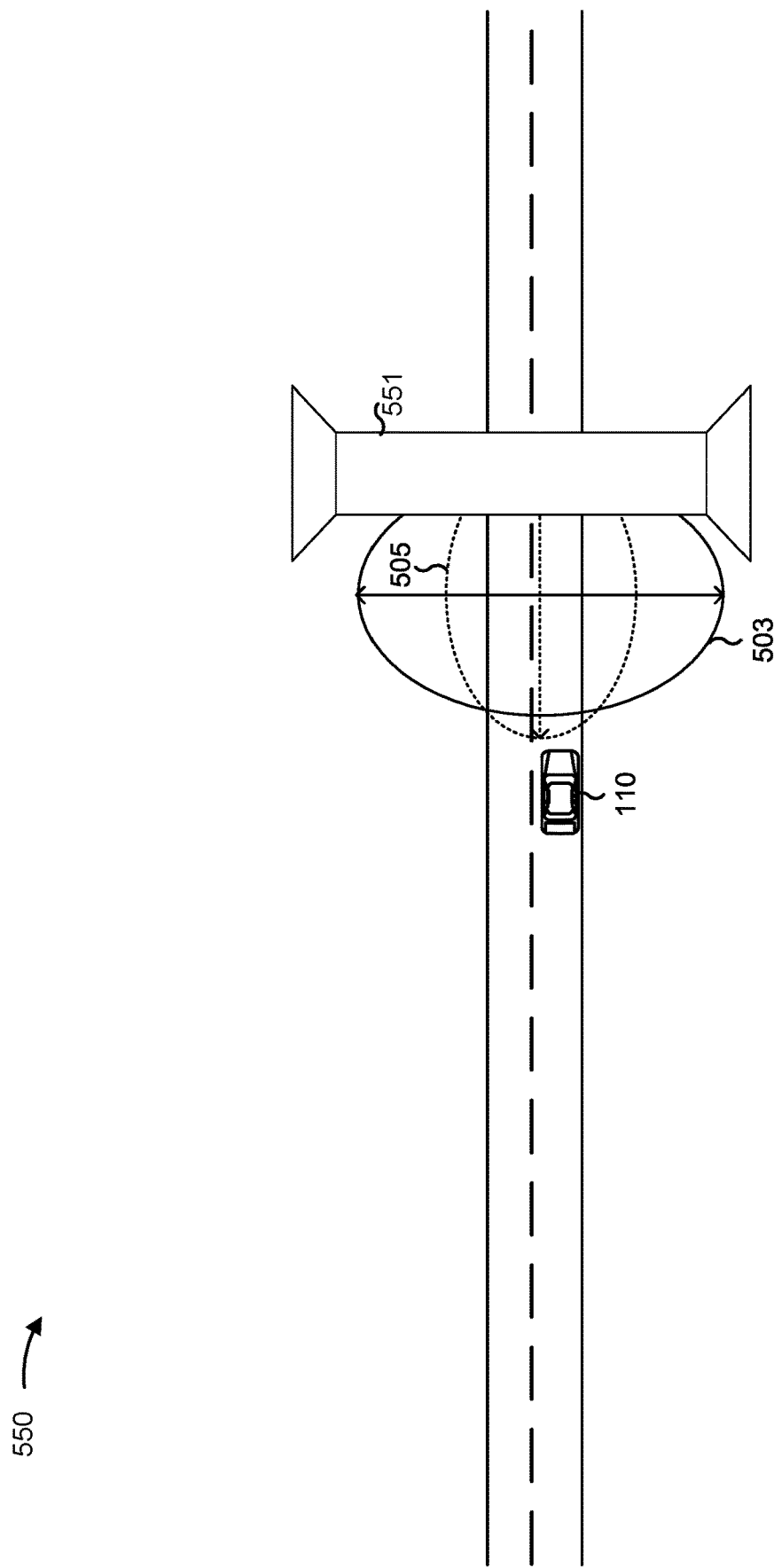

FIGS. 5A and 5B are diagrams illustrating examples 500 and 550, respectively, associated with object detection and ranging using one-dimensional radar arrays, in accordance with the present disclosure. As shown in FIG. 5A, example 500 includes an automated vehicle 110 (or another mobile station) proceeding along a road (or another path). The automated vehicle 110 may include a first one-dimensional radar arranged corresponding to a first axis along an azimuthal plane (e.g., similar to azimuthal radar 403 described above in connection with FIG. 4) and associated with a portion 503 of the FoV associated with the automated vehicle 110. Additionally, the automated vehicle 110 may include a second one-dimensional radar arranged corresponding to a second axis along an elevation plane (e.g., similar to elevation radar 405 described above in connection with FIG. 4) and associated with a portion 505 of the FoV associated with the automated vehicle 110. As shown in FIG. 5A, the portion 503 may be larger along the first axis than the portion 505, and the portion 503 may be smaller along the second axis than the portion 505. Accordingly, the automated vehicle 110 may determine elevations associated with objects on the road or within a threshold distance of the road (e.g., object 507, which may be a road sign in example 500) using the second one-dimensional radar while refraining from determining elevations associated with objects not within the threshold distance of the road (e.g., object 509, which may be a store sign or a billboard in example 500). Accordingly, the automated vehicle 110 may use the one-dimensional radars to obtain accurate estimates of elevations for some objects (such as object 507) while conserving power and processing resources by not estimating elevations for other objects (such as object 509).

Example 550 of FIG. 5B similarly includes an automated vehicle 110 (or another mobile station) proceeding along a road (or another path). The automated vehicle 110 may include a first one-dimensional radar arranged corresponding to a first axis along an azimuthal plane (e.g., similar to azimuthal radar 403 described above in connection with FIG. 4) and associated with a portion 503 of the FoV associated with the automated vehicle 110. Additionally, the automated vehicle 110 may include a second one-dimensional radar arranged corresponding to a second axis along an elevation plane (e.g., similar to elevation radar 405 described above in connection with FIG. 4) and associated with a portion 505 of the FoV associated with the automated vehicle 110. As shown in FIG. 5B, the portion 503 may be larger along the first axis than the portion 505, and the portion 503 may be smaller along the second axis than the portion 505. Accordingly, the automated vehicle 110 may determine elevations associated with objects on the road or within a threshold distance of the road (e.g., object 551, which may be a bridge in example 500) using the second one-dimensional radar. Accordingly, the automated vehicle 110 may use the one-dimensional radars to obtain more accurate estimates of elevations for overhead objects (such as object 551) such that the automated vehicle 110 does not fail to clear overhead objects due to less accurate elevation estimates.

By using techniques as described in connection with FIGS. 5A and 5B, the automated vehicle 110 may use a smaller portion 505 of the FoV to determine elevations as compared with portion 503 of the FoV used to determine distances. Accordingly, the automated vehicle 110 can achieve higher accuracy with less power consumption and lower processing overhead as compared with using a same portion of the FoV for distances and elevations. Additionally, as shown in FIGS. 5A and 5B, elevations for objects not within a threshold distance of the road are not measured (e.g., object 509 of example 500). As a result, the automated vehicle 110 conserves power and processing resources while still determining elevations for some objects (e.g., object 507 of example 500 and object 551 of example 550) with sufficient accuracy to protect the vehicle (e.g., from attempting to go under the object 551 when the object 551 has an associated clearance smaller than a height of the automated vehicle 110, among other examples).

As indicated above, FIGS. 5A and 5B are provided as examples. Other examples may differ from what is described with respect to FIGS. 5A and 5B.

Figure 6:
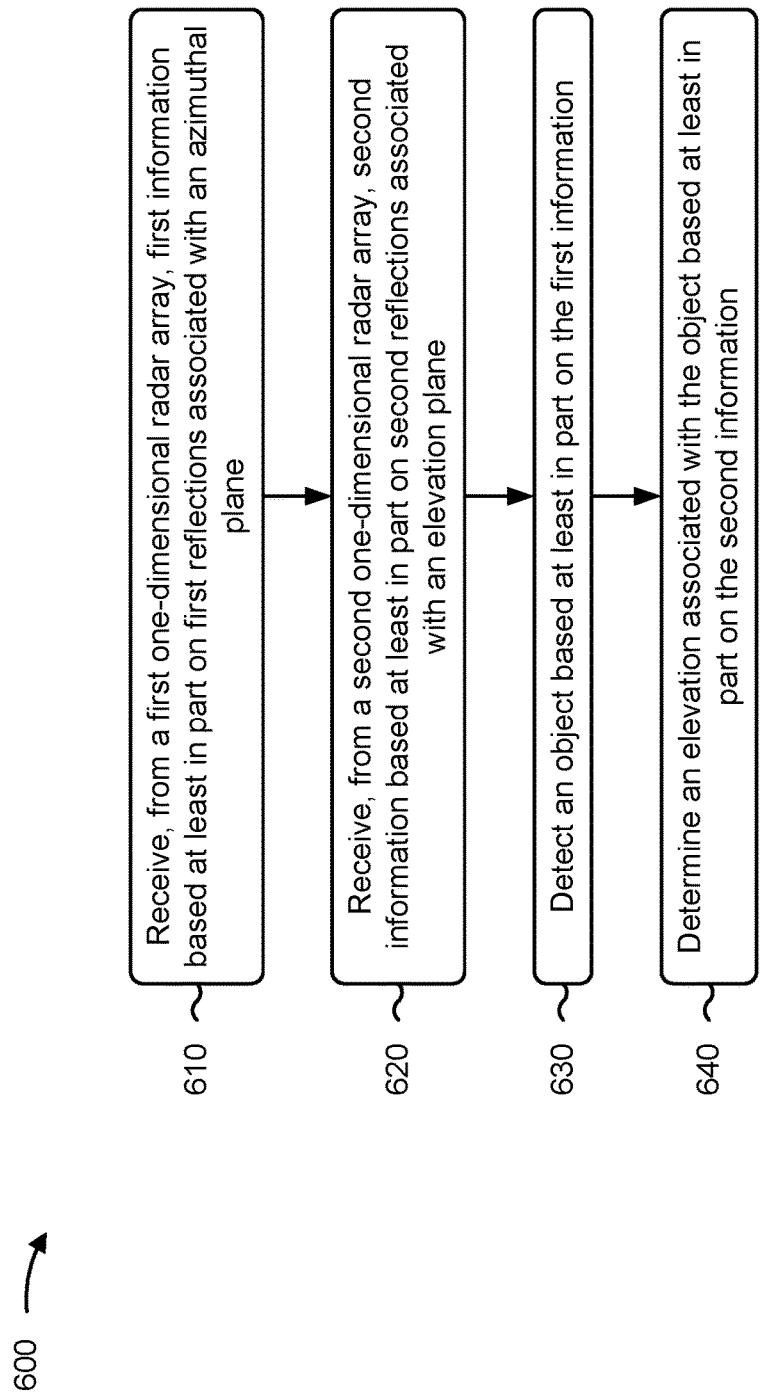
FIG. 6 is a flowchart of an example process associated with object detection and ranging using one-dimensional radar arrays, in accordance with the present disclosure.

FIG. 6 is a flowchart of an example process 600 associated with object detection and ranging using one-dimensional radar arrays. In some implementations, one or more process blocks of FIG. 6 may be performed by a mobile station (e.g., mobile station 110). In some implementations, one or more process blocks of FIG. 6 may be performed by another device or a group of devices separate from or including the mobile station, such as an antenna array (e.g., antenna array 245), a radar controller (e.g., radar controller 250), and/or a driving controller (e.g., driving controller 255). Additionally, or alternatively, one or more process blocks of FIG. 6 may be performed by one or more components of device 200, such as bus 205, processor 210, memory 215, storage component 220, input component 225, output component 230, communication interface 235, and/or position sensor 240.

As shown in FIG. 6, process 600 may include receiving, from a first one-dimensional radar array (e.g., including or included in device 260), first information based at least in part on first reflections associated with an azimuthal plane (block 610). For example, an object detection system of the mobile station may receive (e.g., using communication interface 235), from a first one-dimensional radar array, first information based at least in part on first reflections associated with an azimuthal plane, as described herein.

As further shown in FIG. 6, process 600 may include receiving, from a second one-dimensional radar array (e.g., including or included in device 260), second information based at least in part on second reflections associated with an elevation plane (block 620). For example, the object detection system of the mobile station may receive (e.g., using communication interface 235), from a second one-dimensional radar array, second information based at least in part on second reflections associated with an elevation plane, as described herein.

As further shown in FIG. 6, process 600 may include detecting an object based at least in part on the first information (block 630). For example, the object detection system of the mobile station may detect (e.g., using processor 210 and/or radar controller 250) an object based at least in part on the first information, as described herein.

As further shown in FIG. 6, process 600 may include determining an elevation associated with the object based at least in part on the second information (block 640). For example, the object detection system of the mobile station may determine (e.g., using processor 210 and/or radar controller 250) an elevation associated with the object based at least in part on the second information, as described herein.

Process 600 may include additional implementations, such as any single implementation or any combination of implementations described below and/or in connection with one or more other processes described elsewhere herein.

In a first implementation, process 600 further includes instructing (e.g., using processor 210, communication interface 235, and/or radar controller 250) the first one-dimensional radar array to scan along an axis of the azimuthal plane by using beamforming to generate the first information.

In a second implementation, alone or in combination with the first implementation, process 600 further includes instructing (e.g., using processor 210, communication interface 235, and/or radar controller 250) the second one-dimensional radar array to scan along an axis of the elevation plane by using beamforming to generate the second information.

In a third implementation, alone or in combination with one or more of the first and second implementations, process 600 further includes detecting (e.g., using processor 210 and/or radar controller 250) an additional object based at least in part on the first information, determining (e.g., using processor 210 and/or radar controller 250) that the additional object is outside a range associated with the second one-dimensional radar array, and refraining from determining (e.g., using processor 210 and/or radar controller 250) an elevation associated with the additional object based at least in part on the additional object being outside the range.

In a fourth implementation, alone or in combination with one or more of the first through third implementations, determining the elevation associated with the object includes determining (e.g., using processor 210 and/or radar controller 250) a first distance associated with the object based at least in part on the first information, determining (e.g., using processor 210 and/or radar controller 250) a second distance associated with the object based at least in part on the second information, and correlating (e.g., using processor 210 and/or radar controller 250) the determined elevation with the object based at least in part on a correspondence between the first distance and the second distance.

In a fifth implementation, alone or in combination with one or more of the first through fourth implementations, determining the elevation associated with the object includes identifying (e.g., using processor 210 and/or radar controller 250) the object in a first frame based at least in part on the first information, identifying (e.g., using processor 210 and/or radar controller 250) the object in a second frame, subsequent to the first frame, based at least in part on the second information, and correlating (e.g., using processor 210 and/or radar controller 250) the determined elevation with the object based at least in part on tracking the object across the first frame and the second frame.

In a sixth implementation, alone or in combination with one or more of the first through fifth implementations, process 600 further includes determining (e.g., using processor 210 and/or radar controller 250) a distance associated with the object based at least in part on the first information, and determining (e.g., using processor 210 and/or radar controller 250) a set of coordinates associated with the object based at least in part on the distance and the elevation.

In a seventh implementation, alone or in combination with one or more of the first through sixth implementations, process 600 further includes generating (e.g., using processor 210, output component 230, and/or radar controller 250) a three-dimensional map indicating the object based at least in part on the set of coordinates.

In an eighth implementation, alone or in combination with one or more of the first through seventh implementations, process 600 further includes generating (e.g., using processor 210, communication interface 235, and/or driving controller 255) an instruction, for an automated vehicle, based at least in part on the elevation.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method for object detection, comprising: receiving, from a first one-dimensional radar array, first information based at least in part on first reflections associated with an azimuthal plane; receiving, from a second one-dimensional radar array, second information based at least in part on second reflections associated with an elevation plane; detecting an object based at least in part on the first information; and determining an elevation associated with the object based at least in part on the second information.

Aspect 2: The method of Aspect 1, further comprising: instructing the first one-dimensional radar array to scan along an axis of the azimuthal plane by using beamforming to generate the first signals.

Aspect 3: The method of any of Aspects 1 through 2, further comprising: instructing the second one-dimensional radar array to scan along an axis of the elevation plane by using beamforming to generate the second signals.

Aspect 4: The method of any of Aspects 1 through 3, further comprising: detecting an additional object based at least in part on the first information; determining that the additional object is outside a range associated with the second one-dimensional radar array; and refraining from determining an elevation associated with the additional object based at least in part on the additional object being outside the range.

Aspect 5: The method of any of Aspects 1 through 4, wherein determining the elevation associated with the object comprises: determining a first distance associated with the object based at least in part on the first information; determining a second distance associated with the object based at least in part on the second information; and correlating the determined elevation with the object based at least in part on a correspondence between the first distance and the second distance.

Aspect 6: The method of any of Aspects 1 through 5, wherein determining the elevation associated with the object comprises: identifying the object in a first frame based at least in part on the first information; identifying the object in a second frame, subsequent to the first frame, based at least in part on the second information; and correlating the determined elevation with the object based at least in part on tracking the object across the first frame and the second frame.

Aspect 7: The method of any of Aspects 1 through 6, further comprising: determining a distance associated with the object based at least in part on the first information; and determining a set of coordinates associated with the object based at least in part on the distance and the elevation.

Aspect 8: The method of Aspect 7, further comprising: generating a three-dimensional map indicating the object based at least in part on the set of coordinates.

Aspect 9: The method of any of Aspects 1 through 8, further comprising: generating an instruction, for an automated vehicle, based at least in part on the elevation.

Aspect 10: An apparatus for object detection, comprising a processor; memory coupled with the processor; and instructions stored in the memory and executable by the processor to cause the apparatus to perform the method of one or more of Aspects 1-9.

Aspect 11: A device for object detection, comprising a memory and one or more processors coupled to the memory, the one or more processors configured to perform the method of one or more of Aspects 1-9.

Aspect 12: An apparatus for object detection, comprising a first one-dimensional radar array, a second one-dimensional radar array, and at least one processor configured to perform the method of one or more of Aspects 1-9.

Aspect 13: A device for object detection, comprising a first one-dimensional radar array, a second one-dimensional radar array, and at least one processor configured to perform the method of one or more of Aspects 1-9.

Aspect 14: An apparatus for object detection, comprising at least one means for performing the method of one or more of Aspects 1-9.

Aspect 15: A non-transitory computer-readable medium storing code for object detection, the code comprising instructions executable by a processor to perform the method of one or more of Aspects 1-9.

Aspect 16: A non-transitory computer-readable medium storing a set of instructions for object detection, the set of instructions comprising one or more instructions that, when executed by one or more processors of a device, cause the device to perform the method of one or more of Aspects 1-9.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for object detection, comprising:
a first one-dimensional radar array including a plurality of first antenna elements that are arranged corresponding to a first axis along an azimuthal plane and configured to transmit first signals and receive first reflections based at least in part on the first signals;
a second one-dimensional radar array including a plurality of second antenna elements that are arranged corresponding to a second axis along an elevation plane and configured to transmit second signals and receive second reflections based at least in part on the second signals; and
at least one processor configured to detect an object based at least in part on first information output from the first one-dimensional radar array and to determine an elevation associated with the object based at least in part on:
second information output from the second one-dimensional radar array, and
the object being within a range associated with the second one-dimensional radar array.

2. The system of claim 1, wherein the first one-dimensional radar array is configured to scan along the first axis by using beamforming to generate the first signals.

3. The system of claim 1, wherein the second one-dimensional radar array is configured to scan along the second axis by using beamforming to generate the second signals.

4. The system of claim 1, wherein the first one-dimensional radar array is associated with a range along the first axis and a range along the second axis, and the range along the first axis is larger than the range along the second axis.

5. The system of claim 1, wherein the second one-dimensional radar array is associated with a range along the first axis and a range along the second axis, and the range along the second axis is larger than the range along the first axis.

6. The system of claim 1, wherein the first one-dimensional radar array is associated with a first range along the first axis, the second one-dimensional radar array is associated with a second range along the first axis, and the first range is larger than the second range.

7. The system of claim 1, wherein the first one-dimensional radar array is associated with a first range along the second axis, the second one-dimensional radar array is associated with a second range along the second axis, and the second range is larger than the first range.

8. The system of claim 1, wherein the at least one processor is further configured to:
detect an additional object based at least in part on the first information from the first one-dimensional radar array;
determine that the additional object is outside the range associated with the second one-dimensional radar array; and
refrain from determining an elevation associated with the additional object based at least in part on the additional object being outside the range.

9. The system of claim 1, wherein the at least one processor, to determine the elevation associated with the object, is configured to:
determine a first distance associated with the object based at least in part on the first information from the first one-dimensional radar array;
determine a second distance associated with the object based at least in part on the second information from the second one-dimensional radar array; and
correlate the determined elevation with the object based at least in part on a correspondence between the first distance and the second distance.

10. The system of claim 1, wherein the at least one processor, to determine the elevation associated with the object, is configured to:
identify the object in a first frame based at least in part on the first information from the first one-dimensional radar array;
identify the object in a second frame, subsequent to the first frame, based at least in part on the first information from the first one-dimensional radar array; and
correlate the determined elevation with the object based at least in part on tracking the object across the first frame and the second frame.

11. The system of claim 1, wherein the at least one processor is further configured to:
determine a distance associated with the object based at least in part on the first information from the first one-dimensional radar array; and
determine a set of coordinates associated with the object based at least in part on the distance and the elevation.

12. The system of claim 11, wherein the at least one processor is further configured to:
generate a three-dimensional mapping indicating the object based at least in part on the set of coordinates.

13. The system of claim 1, wherein the at least one processor is further configured to:
generate an instruction, for an automated vehicle that includes the system, based at least in part on the elevation.

14. A system for object detection, comprising:
at least one processor configured to:
receive, from a first one-dimensional radar array, first information based at least in part on first reflections associated with an azimuthal plane;
receive, from a second one-dimensional radar array, second information based at least in part on second reflections associated with an elevation plane;
detect an object based at least in part on the first information; and
determine an elevation associated with the object based at least in part on the second information and the object being within a range associated with the second one-dimensional radar array.

15. The system of claim 14, wherein the at least one processor is further configured to:
detect an additional object based at least in part on the first information;
determine that the additional object is outside the range associated with the second one-dimensional radar array; and
refrain from determining an elevation associated with the additional object based at least in part on the additional object being outside the range.

16. The system of claim 14, wherein the at least one processor, to determine the elevation associated with the object, is configured to:
determine a first distance associated with the object based at least in part on the first information;
determine a second distance associated with the object based at least in part on the second information; and
correlate the determined elevation with the object based at least in part on a correspondence between the first distance and the second distance.

17. The system of claim 14, wherein the at least one processor, to determine the elevation associated with the object, is configured to:
identify the object in a first frame based at least in part on the first information;
identify the object in a second frame, subsequent to the first frame, based at least in part on the second information; and
correlate the determined elevation with the object based at least in part on tracking the object across the first frame and the second frame.

18. The system of claim 14, wherein the at least one processor is further configured to:
determine a distance associated with the object based at least in part on the first information; and
determine a set of coordinates associated with the object based at least in part on the distance and the elevation.

19. The system of claim 18, wherein the at least one processor is further configured to:
generate a three-dimensional mapping indicating the object based at least in part on the set of coordinates.

20. The system of claim 14, wherein the at least one processor is further configured to:
generate an instruction, for an automated vehicle that includes the system, based at least in part on the elevation.

21. A method for object detection, comprising:
receiving, from a first one-dimensional radar array, first information based at least in part on first reflections associated with an azimuthal plane;
receiving, from a second one-dimensional radar array, second information based at least in part on second reflections associated with an elevation plane;
detecting an object based at least in part on the first information; and determining an elevation associated with the object based at least in part on the second information and the object being within a range associated with the second one-dimensional radar array.

22. The method of claim 21, further comprising:
instructing the first one-dimensional radar array to scan along an axis of the azimuthal plane by using beamforming to generate the first information.

23. The method of claim 21, further comprising:
instructing the second one-dimensional radar array to scan along an axis of the elevation plane by using beamforming to generate the second information.

24. The method of claim 21, further comprising:
detecting an additional object based at least in part on the first information;
determining that the additional object is outside the range associated with the second one-dimensional radar array; and
refraining from determining an elevation associated with the additional object based at least in part on the additional object being outside the range.

25. The method of claim 21, wherein determining the elevation associated with the object comprises:
determining a first distance associated with the object based at least in part on the first information;
determining a second distance associated with the object based at least in part on the second information; and
correlating the determined elevation with the object based at least in part on a correspondence between the first distance and the second distance.

26. The method of claim 21, wherein determining the elevation associated with the object comprises:
identifying the object in a first frame based at least in part on the first information;
identifying the object in a second frame, subsequent to the first frame, based at least in part on the second information; and
correlating the determined elevation with the object based at least in part on tracking the object across the first frame and the second frame.

27. The method of claim 21, further comprising:
determining a distance associated with the object based at least in part on the first information; and
determining a set of coordinates associated with the object based at least in part on the distance and the elevation.

28. The method of claim 27, further comprising:
generating a three-dimensional map indicating the object based at least in part on the set of coordinates.

29. The method of claim 21, further comprising:
generating an instruction, for an automated vehicle, based at least in part on the elevation.

30. A non-transitory computer-readable medium storing a set of instructions for wireless communication, the set of instructions comprising:
one or more instructions that, when executed by one or more processors of an object detection system, cause the object detection system to:
receive, from a first one-dimensional radar array, first information based at least in part on first reflections associated with an azimuthal plane;
receive, from a second one-dimensional radar array, second information based at least in part on second reflections associated with an elevation plane;
detect an object based at least in part on the first information; and
determine an elevation associated with the object based at least in part on the second information and the object being within a range associated with the second one-dimensional radar array.

* * * * *